United States Patent [19]

Jones

[11] Patent Number: 4,551,286

[45] Date of Patent: Nov. 5, 1985

[54] METHOD OF MAKING PICTURES

[76] Inventor: William A. Jones, Box 189, Everett, Wash. 98201

[21] Appl. No.: 426,605

[22] Filed: Sep. 29, 1982

Related U.S. Application Data

[63] Continuation-in-part of Ser. No. 284,939, Jul. 20, 1981, Pat. No. 4,499,127.

[51] Int. Cl.$^4$ ............ B29D 11/00

[52] U.S. Cl. ............ 264/1.9; 264/45.4; 264/132; 264/220

[58] Field of Search ............ 264/1.9, 45.4, 132, 264/220, 293

[56] References Cited

U.S. PATENT DOCUMENTS

| | | | |
|---|---|---|---|
| 731,744 | 6/1903 | Berninger | 428/14 |
| 1,466,107 | 8/1923 | Aloe | 428/13 |
| 2,977,639 | 4/1961 | Barkhuff, Jr. et al. | 264/45.4 |
| 3,287,193 | 11/1966 | Klein | 264/132 |
| 3,306,956 | 2/1967 | Barnette | 264/220 |
| 4,332,074 | 6/1982 | Auld et al. | 264/1.9 |
| 4,386,123 | 5/1983 | Coburn, Jr. | 264/1.9 |

OTHER PUBLICATIONS

*The Random House College Dictionary,* Rev. Ed., 1982, New York, p. 969.

*Primary Examiner*—Donald Czaja
*Assistant Examiner*—Mary Lynn Fertig
*Attorney, Agent, or Firm*—Paul H. Gallagher

[57] ABSTRACT

Foil (aluminum) is placed on a backing member (styrofoam), and depressions made in the foil and backing member, and those members become set and hold the depressions. The depressions are made in a pattern to form a picture, and plastic materials are placed in the depressions, that are transparent, and of different colors, and have convex shapes above the top of the depressions, acting as lenses. The depressions are made by the finger, a stylus, or a toothpick. In another embodiment, the backing member is relatively rigid, a stencil having cut-out areas representing a picture is placed over the backing member, and the foil over the stencil, and the depressions are made by following the stencil. Another embodiment includes a shaping form with raised elements over which the foil is placed; both are placed in a mold, and styrofoam in fluent form placed over the foil and enabled to expand, the styrofoam then constituting the backing member. This forces the foil against the shaping form and forms the depressions. The foil and backing member together as a unit are removed from the mold, and the picture completed as in the first cases. In a further embodiment, the plastic material is placed on a glass panel to form the pictorial representation, and the glass panel is placed in the open front side of a box which is otherwise closed and lined with dark velvet. The glass panel is placed with the pictorial representation disposed inwardly.

15 Claims, 17 Drawing Figures

METHOD OF MAKING PICTURES

This application is a continuation-in-part of my prior and co-pending application, Ser. No.284,939, filed July 20, 1981, now U.S. Pat. No.4,499,127.

OBJECTS OF THE INVENTION

A broad object of the invention is to provide a new method of making a picture.

A more specific object is to provide such a method, wherein the following features and advantages are accomplished:

1. A person's artistic talents can be brought into play to great effect.
2. Very unusual effects are achieved, by utilizing light-transmitting and light-reflecting properties, and a variety of colors.
3. A picture can be made with readily accessible and inexpensive materials.
4. Such a picture is extremely effective for attracting and holding the attention of observers.

DESCRIPTION OF CERTAIN PREFERRED EMBODIMENTS

Figure 5A:
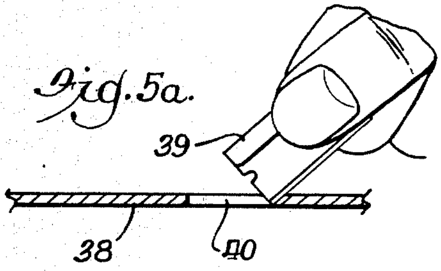
FIG. 5 is a fragmentary perspective view of certain main components of another form of picture made according to the invention.
Figure 5:
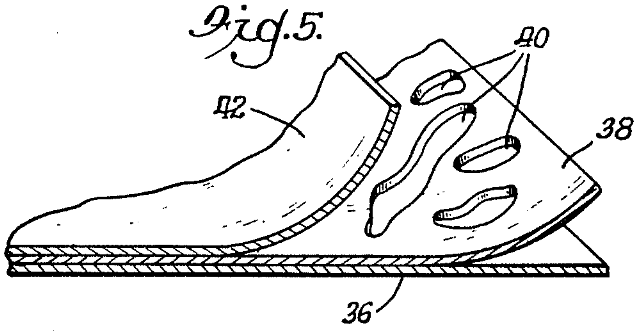
Figure 6:
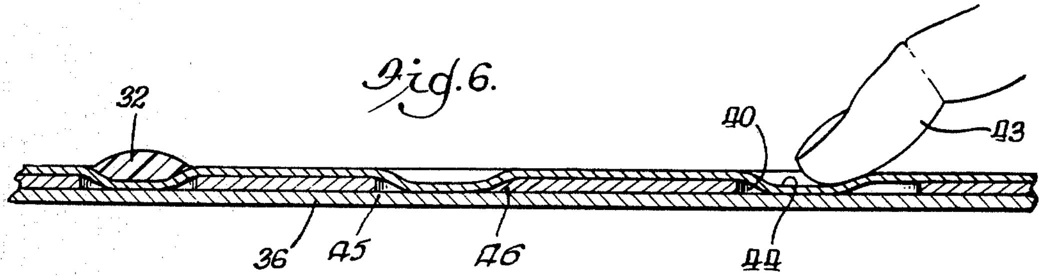
Figure 7:
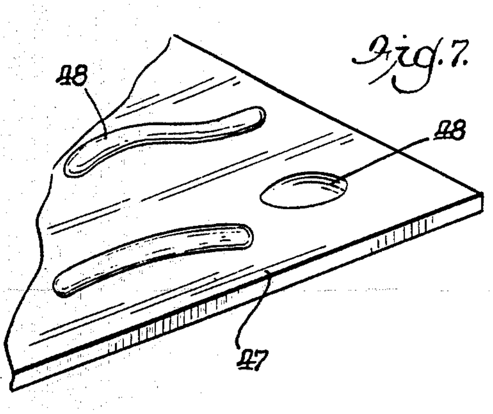
Figure 8:
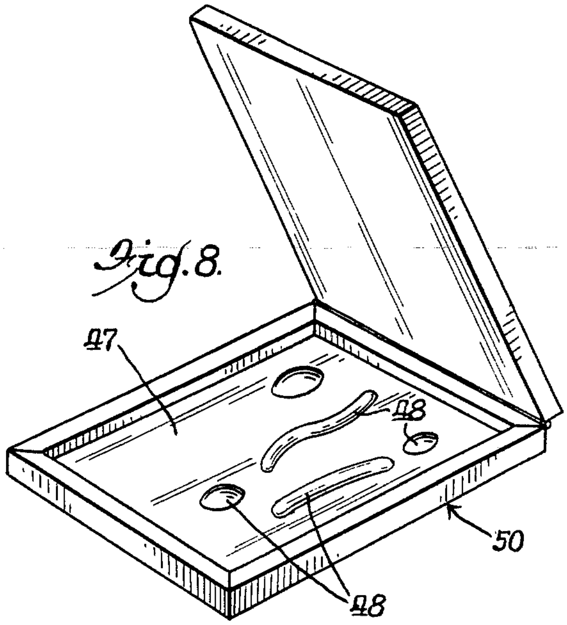
Figure 9:
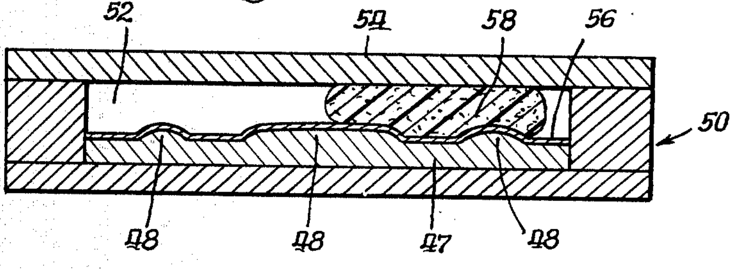
Figure 10:
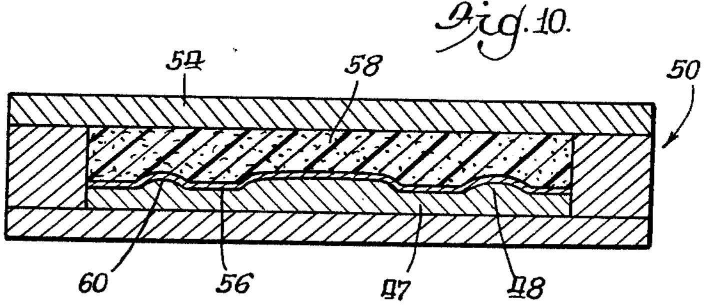
Figure 11:
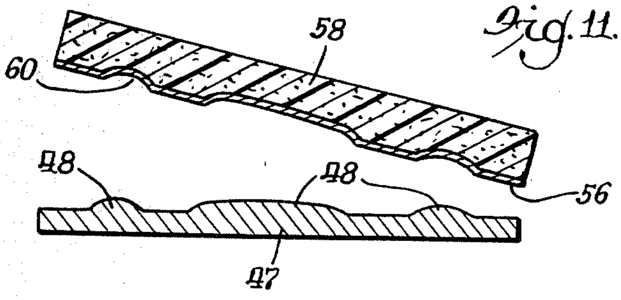
Figure 12:
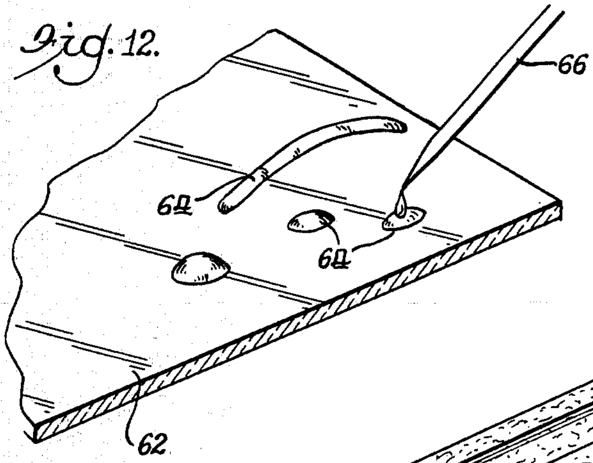
Figure 13:
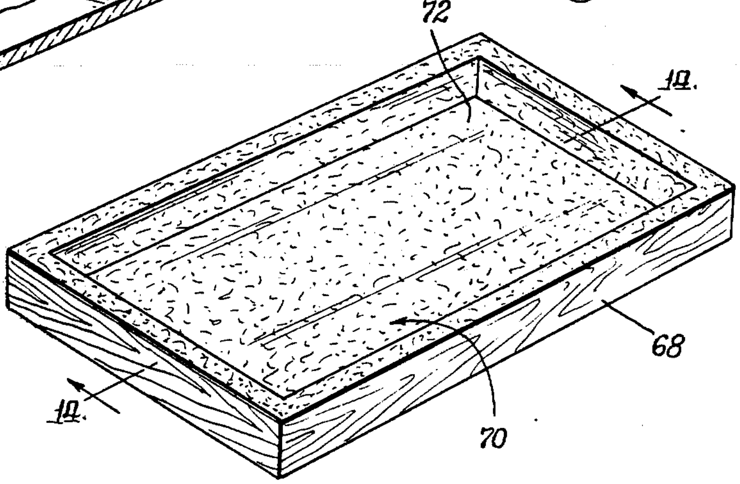
Figure 14:
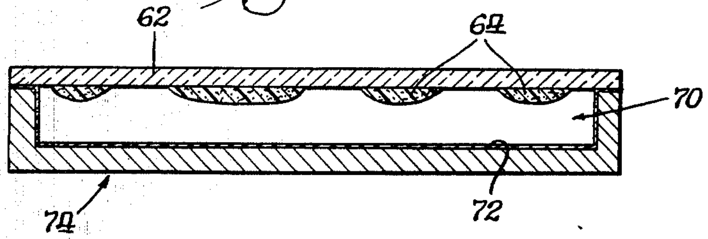
Figure 15:
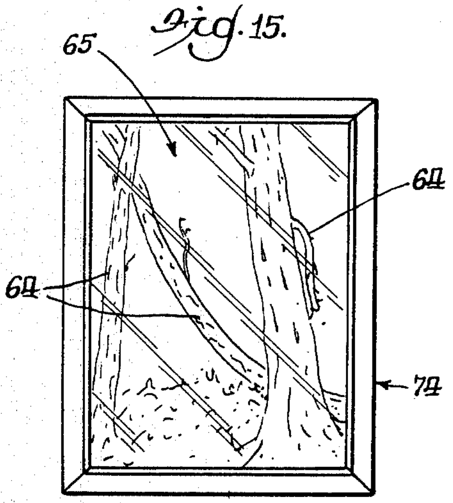
Figure 16:
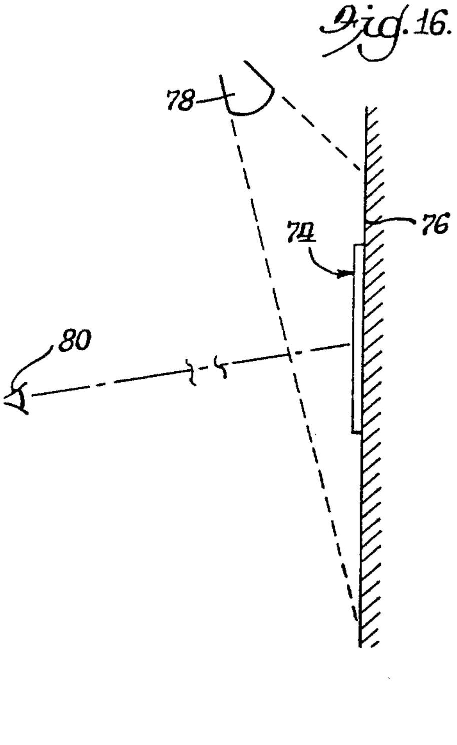

FIG. 5*a* indicates the manner of cutting the stencil of FIG. 5;

FIG. 6 is a sectional view of the material of FIG. 5 but with the layers that are incorporated therein laid down in flat superposed position;

FIG. 7 is a fragmentary perspective view of a shaping form used in producing a modified form of picture according to the invention;

FIG. 8 is a perspective view of a mold in which the shaping form of FIG. 7 is placed, the mold being shown with the cover in open position;

FIG. 9 is a sectional view of the mold of FIG. 8 in closed position with the shaping form therein and foil over the shaping form, and a quantity of plastic foam material over the foil;

FIG. 10 is a view similar to FIG. 9 but with the foam material after having expanded, and filling the cavity;

FIG. 11 shows the shaping form of FIGS. 7-10, and the completed component of the foil and backing member, removed from the mold and indicating the step of separating them;

FIG. 12 is a fragmentary perspective view of a component of a still further embodiment of a picture made according to the invention;

FIG. 13 is a perspective view of a box, to form a picture frame, to which the panel of FIG. 11 is applied;

FIG. 14 is a sectional view oriented according to line 14—14 of FIG. 13, and showing the box of that figure, and the panel of FIG. 12 thereon;

FIG. 15 is a face view of a picture made by the steps represented in FIGS. 12-14; and FIG. 16 is a diagrammatic view of a picture of any of the foregoing forms in place on a wall, and representing the position of a light illuminating it.

Figure 3:
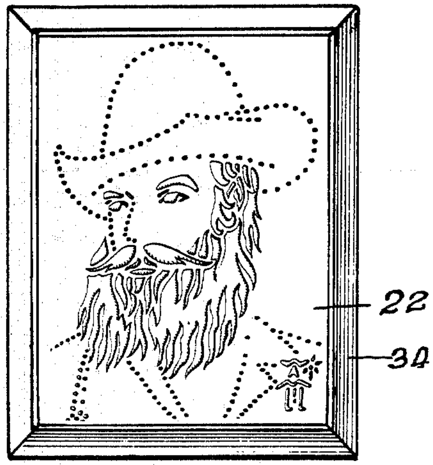
FIG. 3 is a face view of a portrait picture made according to the invention.
Figure 1:
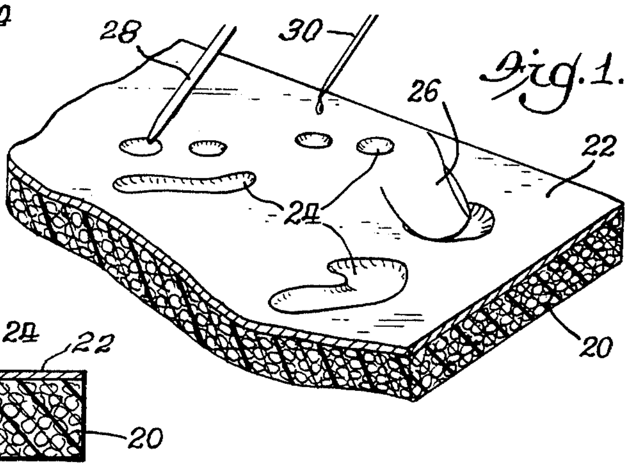
FIG. 1 is a fragmentary perspective view, partially in section, of certain main components of a picture made according to the method of the invention.
Figure 2:
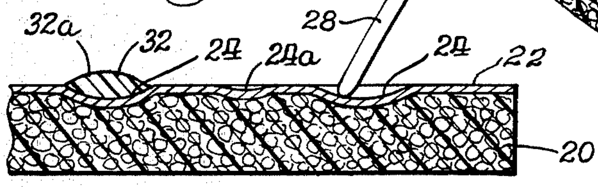
FIG. 2 is a sectional view of a picture indicating the manner of forming depressions, and showing filler material in the depressions.

Referring in detail to the drawings, in FIGS. 1-3, a backing member or layer 20 is provided, which is preferably of styrofoam, semi-rigid in that it is self-sustaining in shape, but it is pliable so that it can be shaped or formed, within certain limits. This characteristic will be referred to hereinbelow in connection with making depressions therein.

The backing member 20 is selected in size and proportions according to the dimensions of the desired final picture. A sheet of foil or second layer 22 is selected of the same size as the backing member. The foil is preferably aluminum, but other materials may be used instead, that are highly reflective, a characteristic of significance and importance in the invention. The foil is preferably on the order of 0.003 inches thick, although of course it is not limited to this dimension. Foil known as kitchen foil is satisfactory. The foil is adhered to the backing member 20 by any suitable adhesive material, many of which are known and on the market. The sheet or second layer 22 need not be entirely of metal, but may consist of an element or film of plastic material, such as that known as "Mylar," coated with another element or film of reflective material such as aluminum. The reflective material may be applied by electro plating, vacuum metallizing, or even still other methods.

Following the foregoing steps, depressions or indentations 24 are formed in the face of the foil, by any suitable instrumentality such as the finger as indicated at 26, a stylus 28, or a toothpick 30, etc. If desired, the intended picture may first be sketched on the foil. Pressure is applied to the face of the foil until the depression of desired size and depth is made, this pressure displacing the material of the backing member also, whereby the depression extends into that layer as well. Foil, as is well known, is easily bent and deformed, adapting itself readily to the formation of the depressions. The material of the backing member and of the foil, after the formation of the depressions, takes a set shape, and holds the depressions so formed. The main expanse of the foil, other than the depressions, is held against deformation such as wrinkling, by its attachment to the backing member throughout its area, and the semi-rigidity of the backing member holds the foil in its original first form, such as planar shape.

It will be understood that the depressions 24 may be of any size, shape and depth, and in producing any picture, selected ones of such configurations are utilized. Different conformations, both in outline shape and size, are shown in FIG. 1, and different depths are shown at 24*a* in FIG. 2. Thedepressions 24 are thus formed according to the desired picture, and FIG. 3 shows in face view such a picture in portrait form. The picture includes lines and other elements, of various sizes, shapes and proportions. These also result in different texture as will be referred to hereinbelow. To complete the picture, filler material 32 is deposited in the depressions, being so deposited in a specific manner referred to hereinbelow. The filler material is a mixture of several ingredients. It includes a casting resin, a thixotropic material, a dye, and a catalyst. The casting resin, a polyester, chemically inert, in liquid form, and clear, does not harden by evaporation. The thixotropic material, is a silicon in the form of a powder, and is added to the casting resin to thicken it. It is chemically inert in the casting resin. The dye is then added, this being preferably transparent. Finally the catalyst is added to harden it, this being preferably a methyl ethyl ketone. The mixture thus prepared is transparent. All of the foregoing materials are now on the market, and known to artists and craftsmen. The material remains in pliant form for a time, enabling it to be applied and worked, but it hardens after a suitable period, such for example as 15–20 minutes. Accordingly only a small amount of the material is prepared at a time.

The filler material 32 is placed in such quantity as to fill the depressions, and preferably to also extend above the top surface of the foil, as represented at 32*a* in FIG. 2, which presents an added effect in that it acts as a lens. Other materials of course may be used as a casting resin, such as polyurethane and epoxy although these are not as satisfactory as polyester. The material adheres of course to the foil, as it hardens and sets, so that the resulting picture may be put in any position without the material falling off.

Due to the lens shape of the material, at 32*a*, a very unusual effect is provided by the picture. The light reflects from the overall picture as a whole, not only reflecting from the outer surface of the lens material, but penetrating through the material and reflected from the back surface thereof, and from the surface of the foil in the depression as well, and out to the observer. Other features and techniques may be utilized, such as rendering the surface of the foil, between the depressions, non-reflective or relatively so, so that the principal portion of the reflected light is from the plastic materials, and not, or less so, from the general surface of the layer of the foil. The plastic materials are often of different colors, but it is to be pointed out that the invention also covers the use of a single color in a picture. The lens shape plastic material particles 32*a* produce a "jewel" effect which is extremely attractive.

For a still further effect, the colors may be mixed, that is, several colors used in a single depression 24. For example, the surface of the depression may be partially coated with one color and then the depression filled with material of another color. This produces a particularly striking effect in the case of flowers, where petals may have a partial coloring at their inner ends, diminishing in intensity as it proceeds outwardly.

Another characteristic of the picture results from the different sizes of depressions utilized to form the picture. For example, relatively large depressions would be made by the finger, smaller ones by a stylus of any desired size and extremely small depressions by a toothpick or other such small article. These different sized depressions, and correspondingly different sized particles of plastic material, form an unusual effect, both when a number of uniform sizes are together in each of different areas, or when those of various sizes are intermixed throughout. This difference in sizes, and even in colors, of the picture elements produces a texture to the picture, and a most extremely unusual effect.

The picture completed according to the foregoing, which includes the backing member 20, the foil 22, and the plastic materials 32, form a rigid and complete picture which may be mounted as is, or in a suitable frame 34 as in FIG. 3.

The picture of a man of FIG. 3 shows to good and unusual effect the use of the elements 32 of various kinds, different sizes and shapes, and placement and grouping, spacing apart and variation of the extend of the spacing and interconnection between some of them. As noted above, they may be of differentcolors, and FIG. 3 gives a good indication of the effect of different colors, such as the skin, the beard, the cloths including hat. Unusual texture is also produced.

Figure 4:
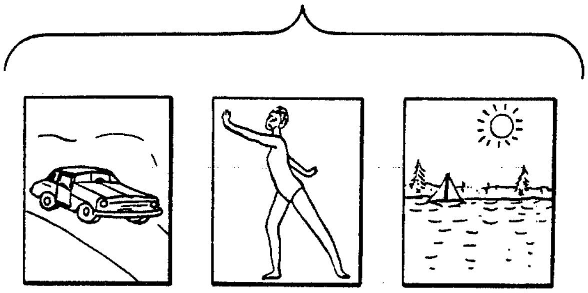
FIG. 4 is a face view of a plurality of pictures indicating widely different kinds of representations.

FIG. 4 is a diagrammatic illustration of several pictures showing different characters or pictorial representations, to indicate the wide range of the applicability of the invention. The pictures may include people, scenes, machines, etc. In such cases as these also, unusual effect is produced.

Reference is made next to FIGS. 5, 5*a* and 6 showing a modified form of picture made according to the invention. In this form a backing member 36 is provided, which may be any of various materials, such as cardboard, wood, etc., preferably rigid and self-sustaining. A second layer 38 is provided with a plurality of cut-outs 40 therein, which may be cut by a suitable tool such as a knife or razor blade 39, as shown in FIG. 5*a*, forming a stencil, These cut-outs are of such size, shape, proportions, and dimensions as desired, according to the formation of the depressions as described above, to produce a picture, a pictorial representation, or a pattern. Next a foil 42 which may be similar to the foil 22 above, is put over the stencil, and the three layers are secured together in flat superposed position, and adhered by a suitable adhesive material. Then the foil is depressed into the cut-outs or openings 40 as by the finger 43, thus forming depressions 44, corresponding to the depressions 24 above. The cut-outs 40 may have straight side edges 45, or the edges may be tapered or inclined as at 46, to facilitate forming the indentations in the foil. The plastic material, such as 32 referred to above, is then placed in the depressions in the same manner as described above.

The end result of forming the picture or shaping the foil, according to the present form of the invention, is the equivalent of that described above in connection with the first embodiment, except that in the present case the depressions 44 may be larger than in the previous case, because of the difficulty in making small cut-outs 40 in the stencil, since as will be recalled in the previous case, certain depressions are small because made by a stylus or toothpick.

FIGS. 7–11 illustrate another form of picture made according to the invention. In this instance, a shaping form 47 is provided, of rigid material, and formed thereon are raised elements 48 forming a picture or pattern to be produced. The elements 48, being embossments or positive elements are utilized to form the depressions desired in the foil and backing member, and therefore the representation or pattern formed on the shaping form is made in reverse of the intended picture. The shaping form 47 is placed in a mold 50 having a cavity 52 and a cover 54, and a foil 56 is placed over the form, and a quantity of plastic material 58 such as styrofoam is placed over the foil. FIG. 9 represents the styrofoam 58 in relatively small quantity, less than the volume of the cavity, and it is permitted to expand, whereby it fills the cavity, and forces the foil down against the shaping form, and the raised elements 48 form depressions or indentations 60 on the under side of the foil. The material 58 and the foil together form a unitary article and is lifted out of the cavity, with the form, and separated from the form as represented in FIG. 11. The compound article consisting of the material 58 and the foil 56 constitutes an article equivalent of the backing member 20 and foil 22 of the first embodiment. The picture is then completed according to the description above in connection with the first form of picture.

FIGS. 12–16 illustrate still another kind of picture made according to the invention. In this embodiment a glass panel 62 is provided, and plastic material 64 the equivalent of the plastic material 32 referred to above is deposited on the glass panel in a pattern to represent the desired picture, also in accordance with the foregoing description. The plastic material may be applied by any suitable instrument such as indicated at 66 in the use of which the material 64 falls off in droplets.

The glass panel 62 is then mounted in or on a box 68 which has an open front side 70 and is otherwise closed, and is lined with a light-absorbent material such as velvet 72 which may be black, or other dark color. The glass panel is preferably mounted with the pattern 64 inwardly, and in that case, the pattern is in reverse, for viewing a predetermined picture from the front. This assemblage then forms a completed picture or construction 74. As in the previous modifications, the plastic material 64 is transparent, and preferably dyed to color. Light then reflects from the plastic material, both the front side thereof which is in engagement with the rear surface of the glass panel, and remote side, in the manner of light reflecting from raindrops.

In the case of the picture 74, the reflection is derived substantially from the glass panel and plastic material 64, to the exclusion of course of the lining of the box. Black absorbent material has the quality of substantially preventing any stray light reflection, so that the viewer can, effectively, only see the glass panel and the pictorial representation. Additionally, black is found most effective as to be most invisible when compared with the glass panel, in contrast to other colors. Because of the transparency of the glass, in this form of the picture, and of the plastic material, light from the rear would shine through the glass and produce undesireable effects, but the box prevents this, and additionally any light that should shine through the glass from the front is absorbed by the black velvet, this preventing any similar bad effects.

FIG. 15 is a face view of the picture 74 including the glass panel 62 and showing pictorial representation 65. As in the previous embodiments, the pictorial representation may be of any design and character.

Any of the pictures made according to the foregoing may be mounted on a wall 76 as prepresented in FIG. 16. A raking light 78 is mounted as on the ceiling, above the picture and at such an angle that glare therefrom does not reach the viewer as indicated at 80. The raking light may be used in association with any of the other pictures of FIGS. 1–4, 5–6 or 7–11, as well as that of FIGS. 12–16. In the case of any of the pictures, there is considerable reflection from the particles of the transparent plastic material, and the position of the light referred to eliminates or greatly reduces glare.

I claim:

1. A method of making a picture comprising the steps, utilizing a sheet having a regular and uniform surface and of predetermined size to correspondingly determine the size of a picture to be made, and presenting said surface to be viewed to an observer, and applying substances to said surface of the sheet in the form of individually dimensioned and proportioned particles and positioned relative to each other as to form a predetermined picture, and further form a picture independently of and separate from that portion of the sheet that is not covered by the substances and that constitutes a portion of said regular surface, including the step of preselecting such substances that are transparent and the particles thereby reflect light from the surface thereof that is directed to the observer and reflect, from the opposite surface, light that passes through the first mentioned surface.

2. A method according to claim 1 and including, the step of utilizing a sheet in the form of a pliable foil, and forming depressions in the foil to form said pictorial representation and placing said substances in the depressions.

3. A method according to claim 2 and including the step, forming the depressions by placing a pattern to the foil having an outline of the intended representation, and tracing the outline by an instrument to form the depressions in the foil.

4. A method according to claim 2 and including the steps, forming the depressions by placing a stencil under the foil having cut-out portions forming said pictorial representation, and applying an instrument to the foil and following the cut-out portions therewith and thereby forcing the material of the foil into the cut-out portions and consequently form the pictorial representation on the foil corresponding with that in the stencil.

5. A method according to claim 2 and including the steps, producing a positive shaping form with embossments thereon distributed to form a pictorial representation, placing the shaping form against the foil to form depressions in the foil, and so forming the depressions, to form a pictorial representation therein corresponding to that on the shaping form.

6. A method according to claim 5 and including the step, placing an expandable material over the foil, confining the shaping form, foil and expandable material and expanding the expandable material to force the foil against the shaping form and thereby produce said depressions in the foil, the confinement forming a predetermined shape of the expandable material, to form a backing member, and the backing member and foil together forming a panel, separable from the shaping form.

7. A method according to claim 1 and including the step, utilizing a said sheet in the form of a transparent panel.

8. A method according to claim 7 and including the step, placing the panel to view with the space behind it surrounded and enclosed by a light-absorbent material.

9. A method according to claim 1 and including the step, utilizing a said sheet in the form of reflective material.

10. A method according to claim 2 and including the step, utilizing a said foil in form of reflective material, and producing reflections from the outer surfaces of the transparent substances and from the surfaces of the depressions.

11. A method according to claim 10 and including the step, producing the depressions at spaced apart locations, and producing greater reflectivity of the foil in the depressions than in areas between the depressions.

12. A method according to claim 2 and including the step, placing said substances in the depressions in such quantity that the substances extend above the main surface of the foil to form convex lenses.

13. A method according to claim 1 and including, the step of utilizing transparent substances that are colored.

14. A method according to claim 13 and including, the step of utilizing transparent substances of different colors.

15. A method according to claim 14 and including, the step of forming depressions in the sheet, and the step of utilizing a plurality of substances of different colors in each of at least certain of the depressions.

* * * * *